US010591607B2

(12) United States Patent
Woolf et al.

(10) Patent No.: US 10,591,607 B2
(45) Date of Patent: Mar. 17, 2020

(54) TRACKING DEVICE

(71) Applicant: Carrier Corporation, Palm Beach Gardens, FL (US)

(72) Inventors: Heston Grant Woolf, Austin, TX (US); Bill Games, Austin, TX (US); Blair Streit, Austin, TX (US); Robin L. Wald, Bellingham, WA (US); Tim Uys, Leander, TX (US); Stephen Varga, Bedford, NH (US); Jeffrey Allen Leshuk, Davis, CA (US); Richard Mark Desmarais, Londonderry, NH (US)

(73) Assignee: CARRIER CORPORATION, Palm Beach, Gardens, FL (US)

( * ) Notice: Subject to any disclaimer, the term of this patent is extended or adjusted under 35 U.S.C. 154(b) by 744 days.

(21) Appl. No.: 14/779,395

(22) PCT Filed: Mar. 28, 2014

(86) PCT No.: PCT/US2014/032176
§ 371 (c)(1),
(2) Date: Sep. 23, 2015

(87) PCT Pub. No.: WO2014/160939
PCT Pub. Date: Oct. 2, 2014

(65) Prior Publication Data
US 2016/0054448 A1 Feb. 25, 2016

Related U.S. Application Data

(60) Provisional application No. 61/823,573, filed on May 15, 2013, provisional application No. 61/806,145, filed on Mar. 28, 2013.

(51) Int. Cl.
*G01S 19/14* (2010.01)
*G01S 19/34* (2010.01)
(Continued)

(52) U.S. Cl.
CPC .............. *G01S 19/14* (2013.01); *G01K 13/02* (2013.01); *G01S 5/0027* (2013.01); *G01S 19/34* (2013.01);
(Continued)

(58) Field of Classification Search
CPC ........ H01H 17/00; H01H 17/02; H01H 17/06; H01H 17/16; H01H 17/165; H01H 27/00;
(Continued)

(56) References Cited

U.S. PATENT DOCUMENTS 5,421,821 A 6/1995 Janicki et al.
5,518,002 A 5/1996 Wolf et al.
(Continued)

FOREIGN PATENT DOCUMENTS

WO 2004068160 A2 8/2004

OTHER PUBLICATIONS

PCT International Preliminary Report on Patentability; International Application No. PCT/US2014/032176; International Filing Date: Mar. 28, 2014; dated Sep. 29, 2015; pp. 1-8.
(Continued)

Primary Examiner — Peter M Bythrow
(74) Attorney, Agent, or Firm — Cantor Colburn LLP

(57) ABSTRACT

A tracking device (10) configured to track a shipment of cargo is provided including a housing (20) having a complementary top portion (22) and bottom portion (25). The top portion and the bottom portion of the housing are pivotally coupled. A tracking unit, arranged within the housing, includes a processor configured to collect and transmit data. A power unit having at least one power source is arranged within the housing and is configured to supply power to the tracking unit. A circuit board connects the power unit and the tracking unit. The circuit board includes a metal tab arranged adjacent a conductive interface. A portion of a pull tab (80)
(Continued)

formed from a thin, non-conductive material is arranged between the tab and the conductive interface. The tracking device is configured to transform from an inactive state to a fully active state upon removal of the pull tab (80).

10 Claims, 10 Drawing Sheets

(51) Int. Cl.
  *G01S 19/35* (2010.01)
  *G01S 5/00* (2006.01)
  *G01K 13/02* (2006.01)
(52) U.S. Cl.
  CPC ........ *G01S 19/35* (2013.01); *G01K 2013/024* (2013.01)
(58) Field of Classification Search
  CPC ........ H01H 71/50; H01H 71/58; H01H 71/66; H01H 2231/034; H01H 2239/04; H01H 2239/058; H01H 2239/03; H01H 2300/022; H01H 2300/024; H01H 1/12; H01H 1/14; H01H 1/5805; H01H 3/02; H01H 3/32; H01H 3/36; H01H 9/22; H01H 9/226; H01H 9/32; H01H 13/04; H01H 13/20; H01H 13/50; H01H 15/005; H01H 15/24; G01S 19/14; G01S 19/34; G01S 19/35; G01S 5/0009; G01S 5/0018; G01S 5/0027; G01K 13/02; G08B 1/08; G08B 21/18; G08B 21/20
  See application file for complete search history.

(56) References Cited

U.S. PATENT DOCUMENTS

| 5,611,517 | A  |   | 3/1997  | Saadi et al. |         |
|-----------|----|---|---------|--------------|---------|
| 6,087,930 | A  | * | 7/2000  | Kulka        | B60C 23/0493 |
|           |    |   |         |              | 340/447 |
| 6,112,822 | A  |   | 9/2000  | Robin et al. |         |
| 6,132,362 | A  |   | 10/2000 | Tepper et al. |        |
| 6,261,221 | B1 |   | 7/2001  | Tepper et al. |        |
| 6,346,886 | B1 |   | 2/2002  | De La Huerga |         |
| 6,389,143 | B1 |   | 5/2002  | Leedom et al. |        |
| 6,667,936 | B1 |   | 12/2003 | Ditzig       |         |
| 6,798,660 | B2 |   | 9/2004  | Moss et al.  |         |
| 6,902,453 | B2 |   | 6/2005  | Switlik et al. |       |
| 6,929,008 | B2 |   | 8/2005  | Geist        |         |
| 7,080,916 | B1 |   | 7/2006  | Ferrin et al. |        |
| 7,240,797 | B1 |   | 7/2007  | Grossman     |         |
| 7,660,495 | B2 |   | 2/2010  | Hirose et al. |        |
| 7,669,714 | B1 |   | 3/2010  | Grossman     |         |
| 8,025,149 | B2 |   | 9/2011  | Sterry et al. |        |
| 8,086,306 | B2 |   | 12/2011 | Katzman et al. |       |
| 8,091,436 | B2 |   | 1/2012  | Eckhardt et al. |      |
| 8,115,621 | B2 |   | 2/2012  | Rajala et al. |        |
| 8,144,451 | B2 |   | 3/2012  | Rodgers et al. |       |
| 8,176,663 | B2 |   | 5/2012  | Sapp et al.  |         |
| 8,217,482 | B2 |   | 7/2012  | Basoor et al. |        |
| 8,232,017 | B2 |   | 7/2012  | Haltiner, Jr. et al. | |
| 8,273,053 | B2 |   | 9/2012  | Saltzstein   |         |
| 2004/0113783 | A1 | * | 6/2004 | Yagesh     | G06Q 10/08 |
|           |    |   |         |              | 340/568.1 |
| 2005/0083626 | A1 | * | 4/2005 | Bruwer     | H01H 13/063 |
|           |    |   |         |              | 361/93.1 |
| 2006/0066752 | A1 | * | 3/2006 | Kelliher   | G01S 19/19 |
|           |    |   |         |              | 348/373 |
| 2008/0226014 | A1 | * | 9/2008 | Yeomans    | H01H 1/26 |
|           |    |   |         |              | 377/94 |
| 2008/0300786 | A1 | * | 12/2008 | Greenberg | G01S 5/0027 |
|           |    |   |         |              | 701/300 |
| 2010/0188729 | A1 |   | 7/2010  | Forgey et al. |       |
| 2010/0294024 | A1 |   | 11/2010 | Kumar et al. |        |
| 2010/0294680 | A1 |   | 11/2010 | Mowery et al. |       |
| 2010/0299278 | A1 | * | 11/2010 | Kriss     | G06Q 10/08 |
|           |    |   |         |              | 705/332 |
| 2011/0012731 | A1 | * | 1/2011 | Stevens    | G01S 5/0027 |
|           |    |   |         |              | 340/539.31 |
| 2011/0018707 | A1 | * | 1/2011 | Dobson     | A45C 13/18 |
|           |    |   |         |              | 340/539.13 |
| 2011/0028814 | A1 |   | 2/2011  | Petersen et al. |     |
| 2011/0188237 | A1 | * | 8/2011 | Griffiths  | B65D 23/12 |
|           |    |   |         |              | 362/191 |
| 2011/0218414 | A1 |   | 9/2011  | Kamath et al. |       |
| 2011/0240644 | A1 |   | 10/2011 | Kimmell et al. |      |
| 2012/0048848 | A1 |   | 3/2012  | Smith        |         |
| 2012/0067914 | A1 |   | 3/2012  | Sadler et al. |       |
| 2012/0110868 | A1 |   | 5/2012  | Abbondanzio  |         |
| 2012/0134135 | A1 |   | 5/2012  | Richmond     |         |
| 2012/0228186 | A1 |   | 9/2012  | Bromley      |         |
| 2012/0245403 | A1 | * | 9/2012 | Martinez   | A61N 1/40 |
|           |    |   |         |              | 600/13 |
| 2012/0256732 | A1 | * | 10/2012 | McAllister | B65C 9/1865 |
|           |    |   |         |              | 340/10.2 |
| 2012/0296174 | A1 |   | 11/2012 | McCombie et al. |     |
| 2014/0329478 | A1 | * | 11/2014 | Farque    | F16L 55/48 |
|           |    |   |         |              | 455/95 |
| 2015/0339914 | A1 | * | 11/2015 | Kekalainen | G01D 4/002 |
|           |    |   |         |              | 340/506 |

OTHER PUBLICATIONS

Notification of Transmittal of the International Search Report for International Application No. PCT/US2014/032176 dated Sep. 2, 2014; dated Sep. 19, 2014; 5 pages.

Written Opinion of the International Searching Authority for International Application No. PCT/US2014/032176 dated Sep. 2, 2014; dated Sep. 19, 2014; 5 pages.

Communication pursuant to Article 94(3) EPC, Office Action, for Application No. 14 723 229.2-1206 issued by the European Patent Office dated Jun. 21, 2018 (4 pp.).

* cited by examiner

TRACKING DEVICE

BACKGROUND OF THE INVENTION

Exemplary embodiments of the invention relate generally to monitoring cargo while in transit, and more particularly to a portable, reusable electronic device for monitoring a location and temperature of cargo in transit.

Asset management is an important part of commerce. Tracking assets is important to organizations of all kinds, whether it be a company keeping track of inventory to be sold in its stores, or a package delivery provider keeping track of packages being transported through its delivery network. For certain goods and containers, it is vital to control the conditions inside the container, so that the goods reach their final destination in a state fit to be used. In many cases, if the conditions under which the goods are shipped are not to the required standards, their use may be dangerous and even cause death, as in the case of medicines. Exemplary parameters that may be monitored include the internal temperature of the container to determine if the temperature exceeds the permitted range and the percentage of humidity, oxygen or carbon dioxide in the container.

Conventional electronic tracking devices that are configured for use in cold and/or wet environments are typically packaged in industrial plastic cases. Such cases are expensive to fabricate and may affect the operation of the tracking device. To activate such a tracking device, the operator must open the case and follow a complex sequence of instructions to ensure that the GPS and any additional sensors of the tracking device are working properly before installing the tracking device in a desired container. In addition, to use a temperature probe with the tracking device, the operator is required to drill a hole in the plastic case, thereby jeopardizing the waterproof characteristic of the case, and exposing the temperature probe to damage.

BRIEF DESCRIPTION OF THE INVENTION

According to an aspect of the invention, a tracking device configured to track a shipment of cargo is provided including a housing having a complementary top portion and bottom portion. The top portion and the bottom portion of the housing are pivotally coupled. A tracking unit, arranged within the housing, includes a processor configured to collect and transmit data. A power unit having at least one power source is arranged within the housing and is configured to supply power to the tracking unit. A circuit board connects the power unit and the tracking unit. The circuit board includes a metal tab arranged adjacent a conductive interface. A portion of a pull tab formed from a thin, non-conductive material is arranged between the tab and the conductive interface. The tracking device is configured to transform from an inactive state to a fully active state upon removal of the pull tab.

According to another aspect of the invention, a method of activating a reusable tracking device is provided including removing a pull tab from between a metal tab and an adjacent conductive interface of the tracking device. Power is supplied to the tracking unit of the tracking device. The functionality of the tracking unit is verified. A current location of the tracking device is determined. The wireless connection between a processor of the tracking unit and a receiver is verified. The processor transmits the current location to the receiver.

According to yet another aspect of the invention, a method of using a single use tracking device including a power unit and a tracking unit is provided including providing a tracking device for monitoring a location and/or environmental condition of a first shipment of cargo to a first user. The tracking device is configured to remain in an active state once activated. The tracking device is received from the first user. The tracking device is in an active state unless a power source within the power unit of the tracking device is depleted. The tracking device is reconditioned and returned to an inactive state by interrupting a circuit supplying power from the power unit to the tracking unit. The tracking device is provided to a second user to monitor a location and/or an environmental condition of a second shipment of cargo. The tracking device is configured to remain in an active state once activated.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
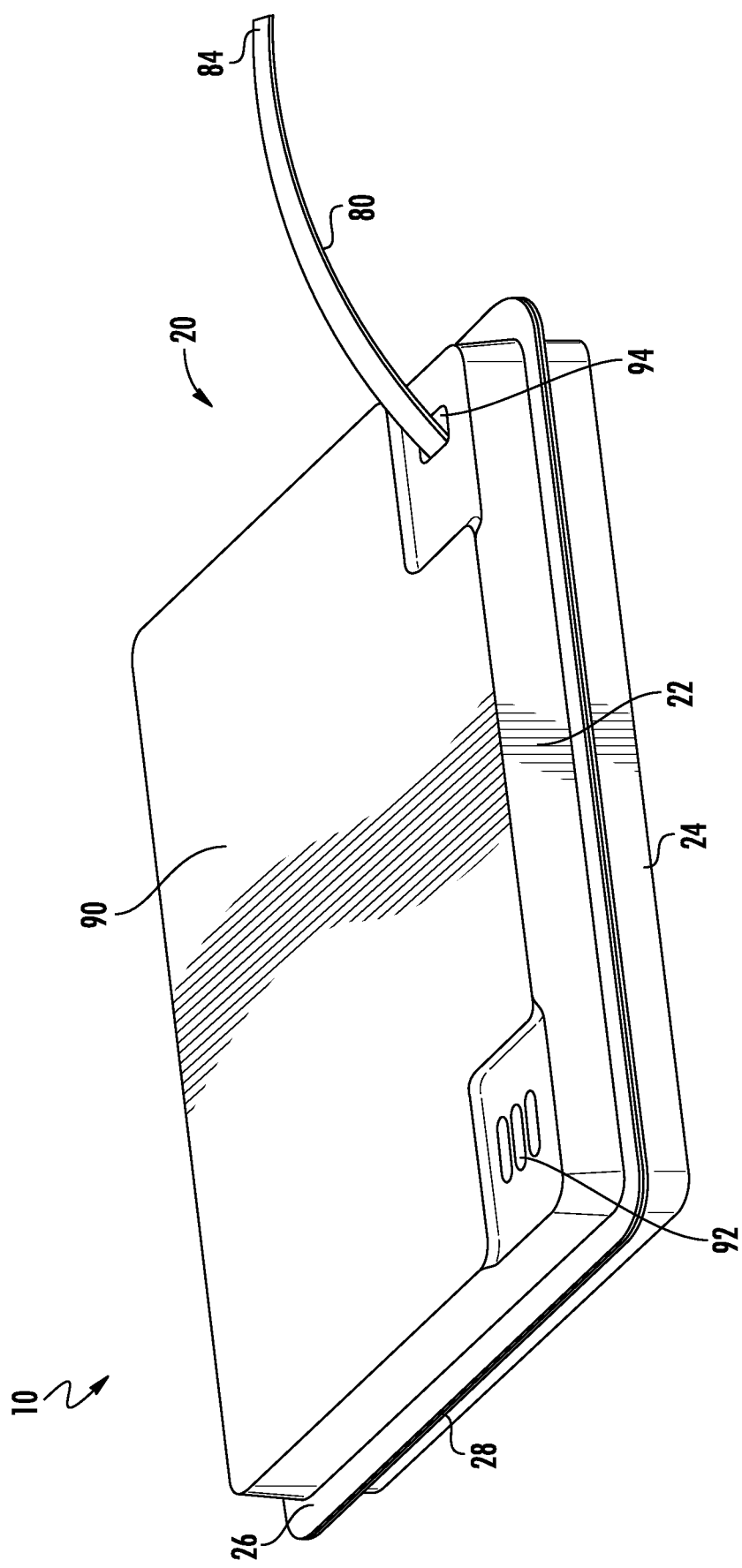
FIG. 1 is a perspective view of a tracking device according to an embodiment of the invention.
Figure 7:
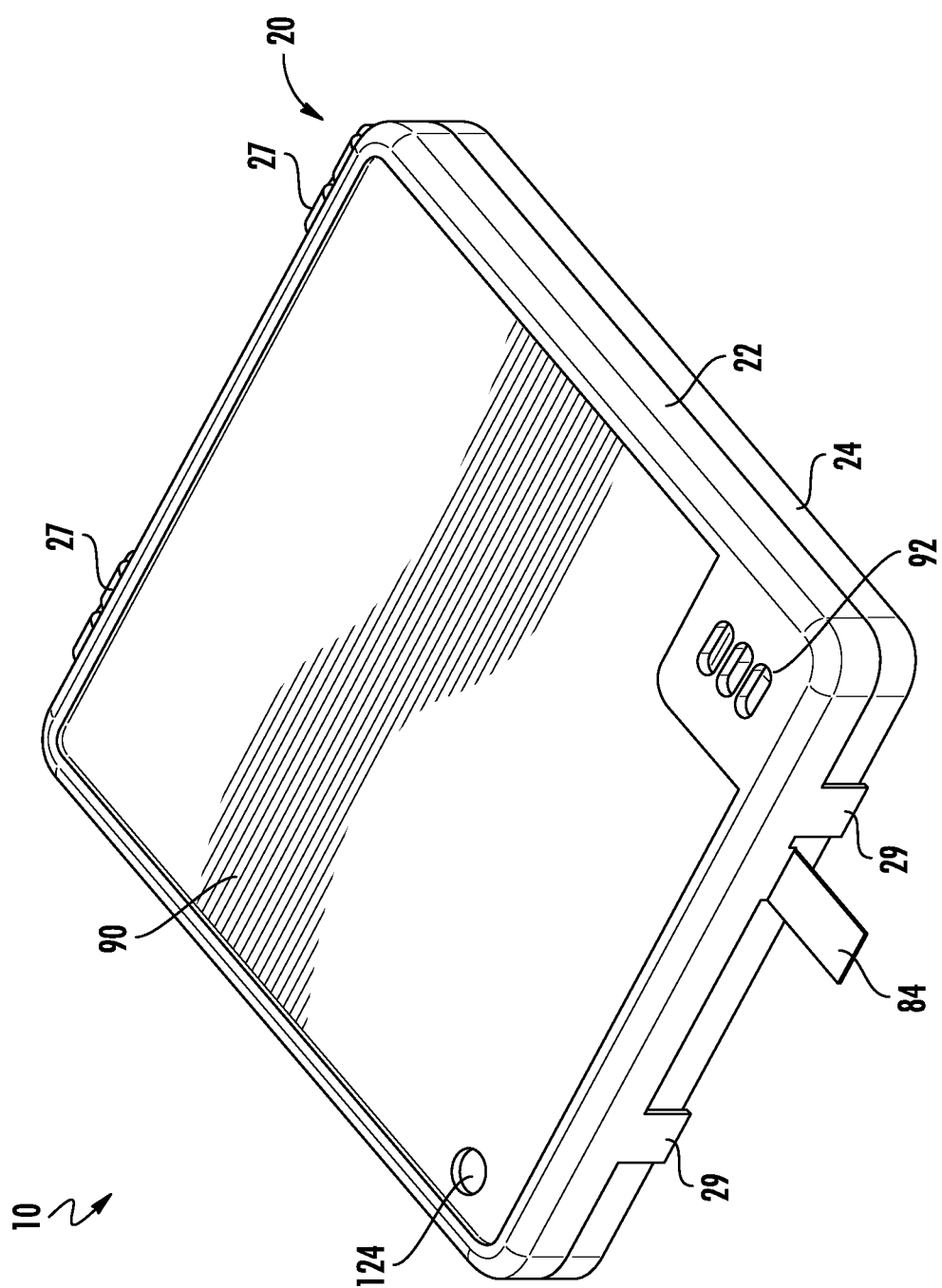
FIG. 7 is a perspective view of the tracking device according to another embodiment of the invention.

Referring now to the FIGS., a portable, reusable tracking device 10 including a protective housing 20 is illustrated. The housing 20 is generally waterproof and includes a complementary top portion 22 and bottom portion 24 (best shown in FIGS. 2 and 8). In one embodiment, the housing 20 is formed from a plastic material, such as through a thermoforming process or an injection molding process for example. The top portion 22 of the housing 20 and the bottom portion 24 of the housing 20 may be formed separately and connected to one another, or may be integrally formed such that the housing 20 has a clamshell configuration. In the illustrated, non-limiting embodiment of FIGS. 1 and 2, a top flange 26 and a bottom flange 28 extend about a periphery of the top portion 22 and the bottom portion 24 of the housing 20, respectively. The top flange 26 and the bottom flange 28 are configured to contact one another when the tracking device 10 is assembled. In one embodiment, the top and bottom flanges 26, 28 may be sealed together, such as through an RF heat sealing process or with an adhesive for example. In another embodiment, illustrated in FIGS. 7 and 8, the top and bottom portions 22, 24 of the housing 20 are coupled together with one or more hinges 27. In addition, one or more tabs 29 may extend from the top portion 22 of the housing 20 in the direction of the bottom portion 24. The tabs 29 are configured to engage the bottom portion 24 to retain the housing 20 in a generally closed position.

Figure 2:
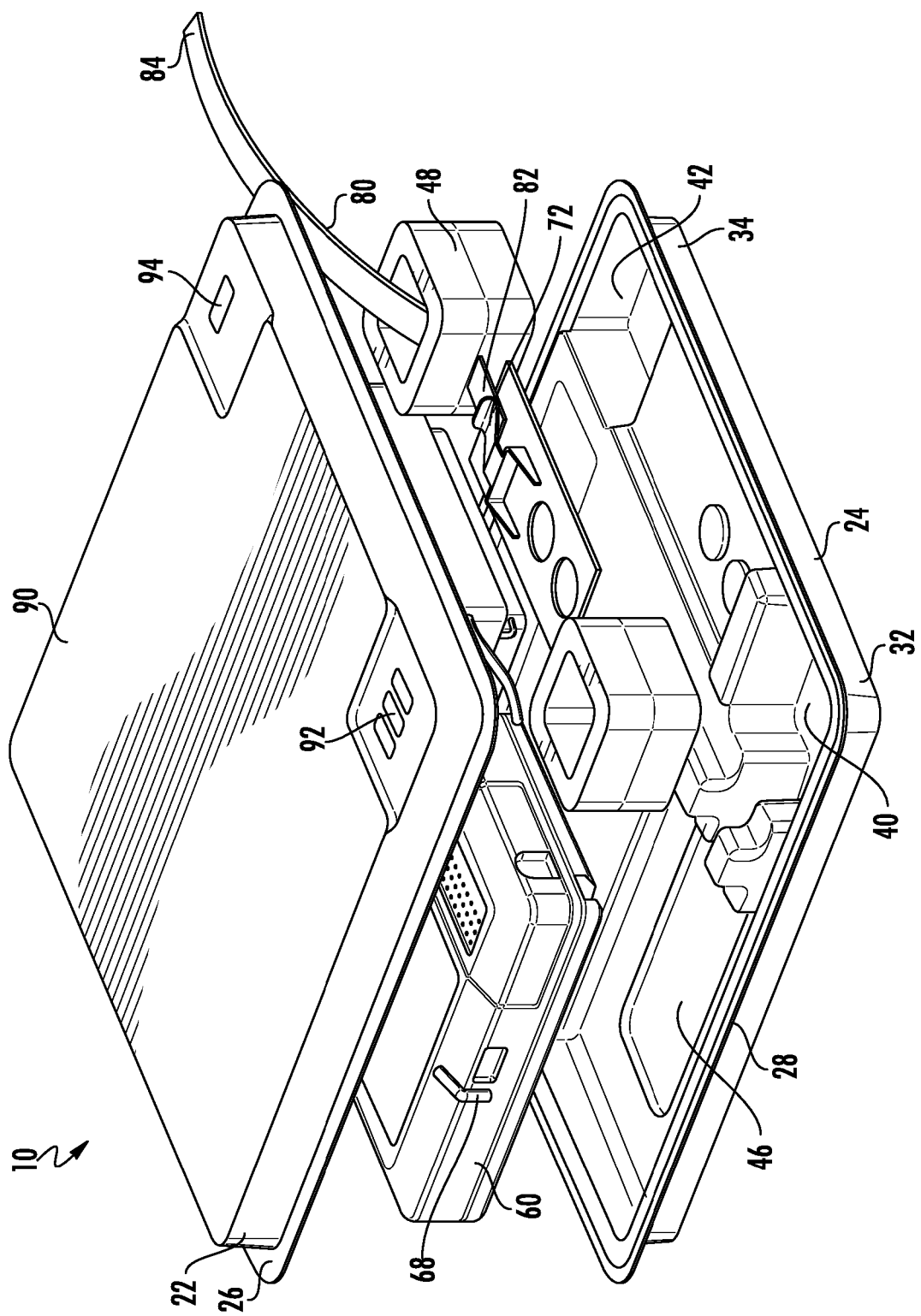
FIG. 2 is an exploded perspective view of a tracking device according to an embodiment of the invention.
Figure 3:
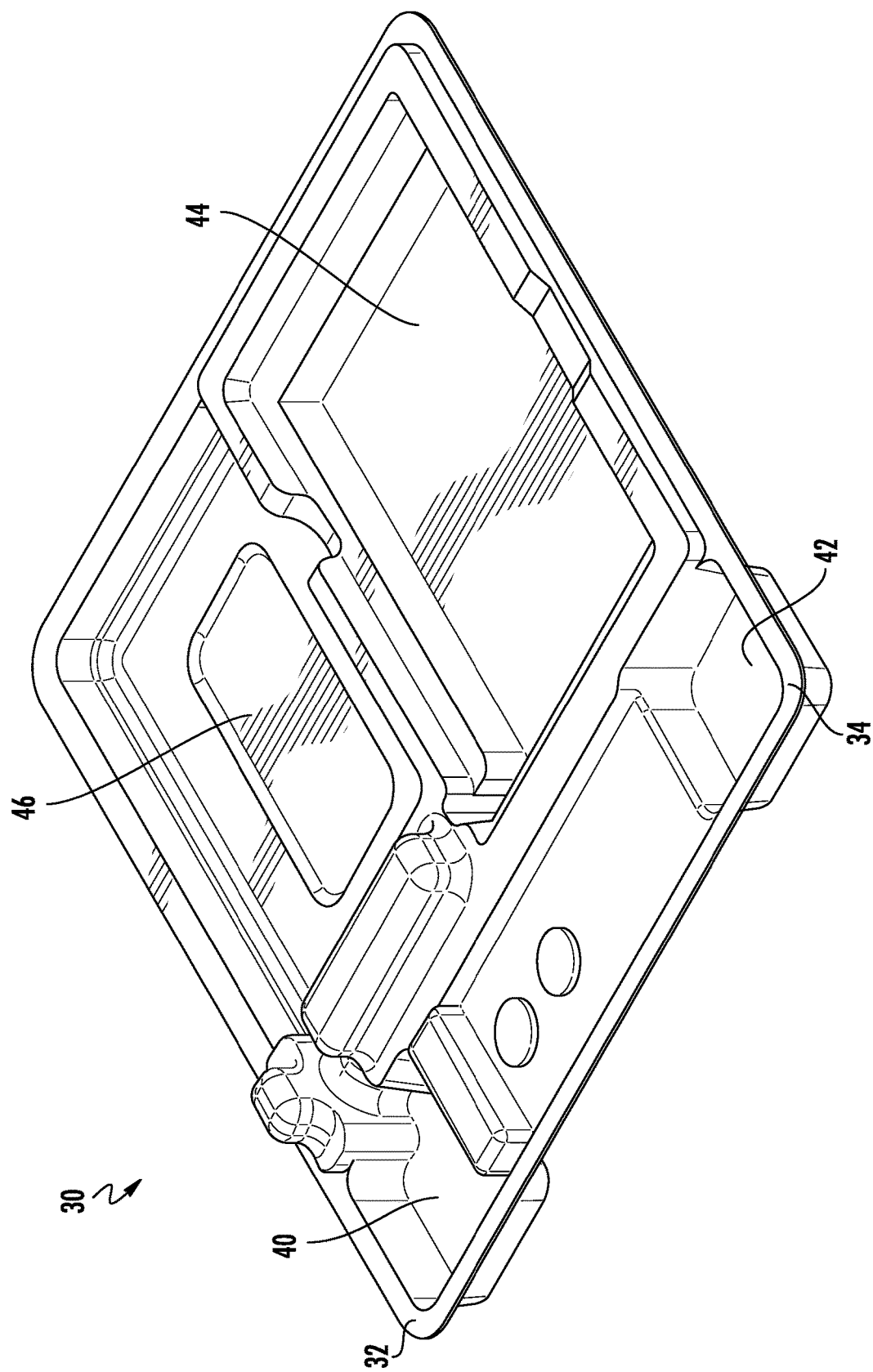
FIG. 3 is a perspective view of a tray arranged within the housing of a tracking device according to an embodiment of the invention.
Figure 8:
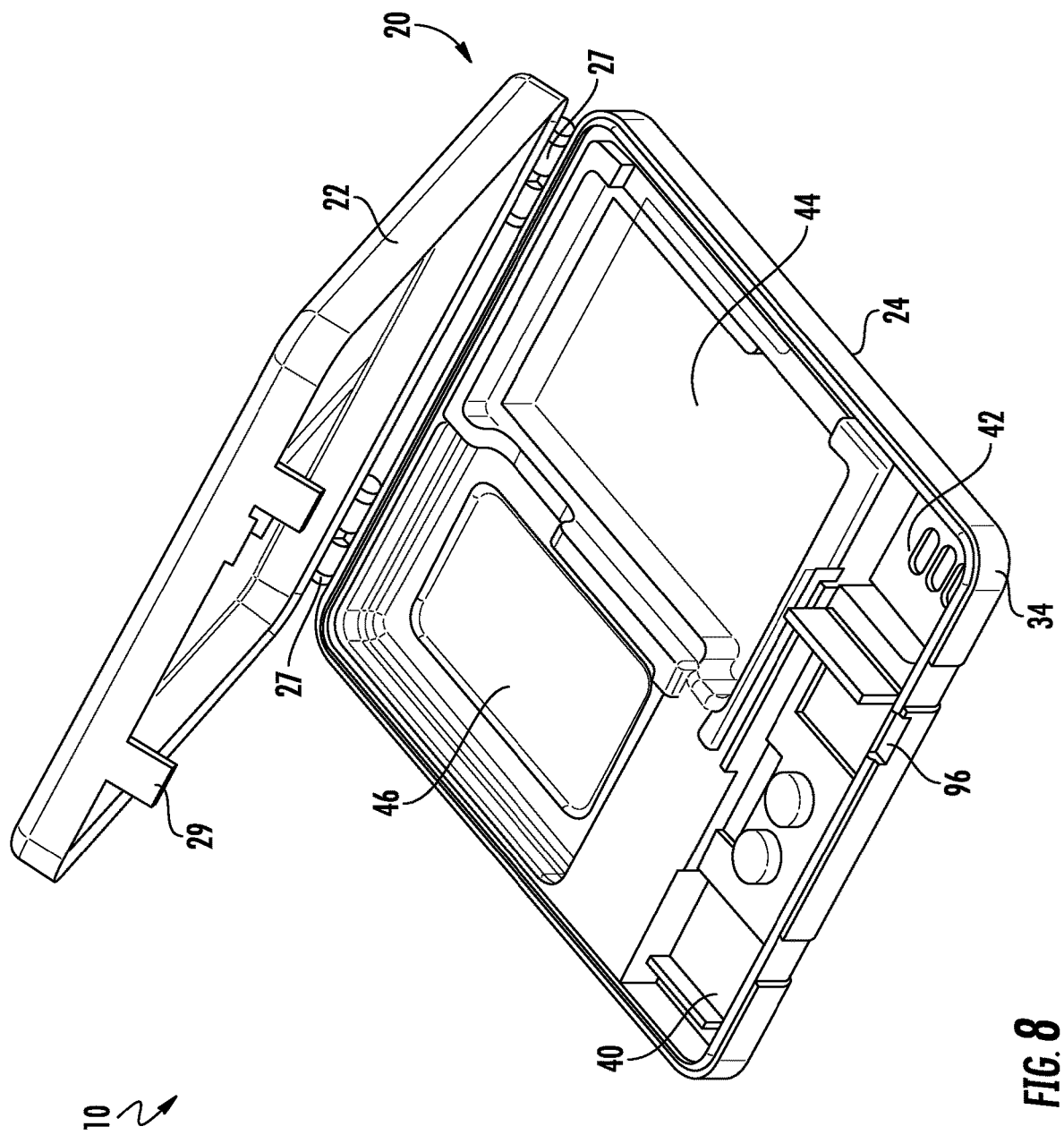
FIG. 8 is an perspective view of an open tracking device according to another embodiment of the invention.

The interior of the bottom portion 24 of the housing 20 is generally configured to receive a contoured tray 30 (FIG. 3); however in another embodiment, the contours of the tray 30 may be integrally formed with the interior of the bottom portion 24 of the housing 20 (FIG. 8). The tray 30 may be formed from a molded plastic material and have a shape and size similar to that of the bottom portion 24 (FIG. 2). The tray 30 generally includes a first cavity 40 adjacent a first corner 32, and a second cavity 42 adjacent a second corner 34. In one embodiment, the first cavity 40 and the second cavity 42 are substantially similar in shape and size. At least one of the first cavity 40 and the second cavity 42 is configured to receive a pair of stacked seals 48, such as foam donut seals for example. When the housing 20 is closed, the seals 48 generally contact an interior surface of the top portion 22 of the housing 20. As a result, wires and/or a component of the tracking device 10 may be positioned within a central opening 49 of each pair of seals 48, without compromising the waterproof enclosure provided by the seals 48.

Figure 4:
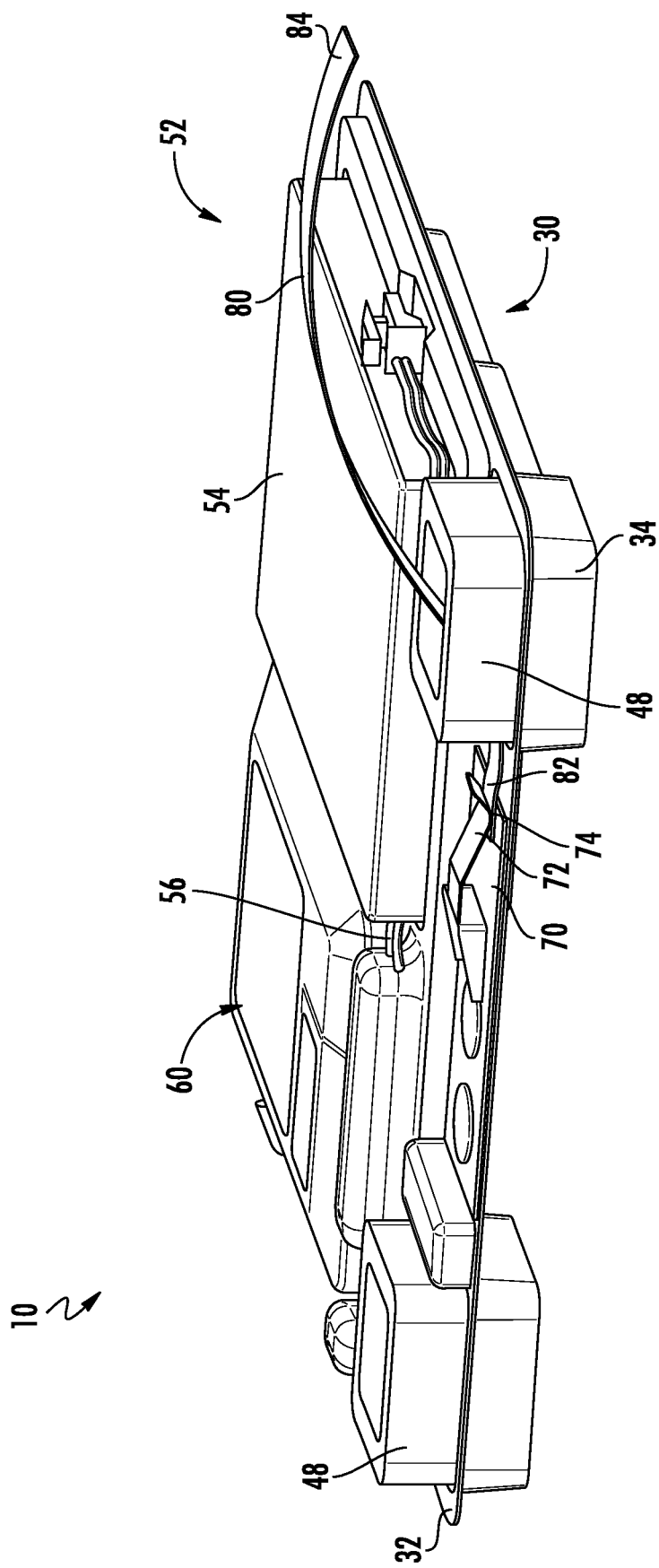
FIG. 4 is a perspective view of the tracking device with the housing removed according to an embodiment of the invention.
Figure 9:
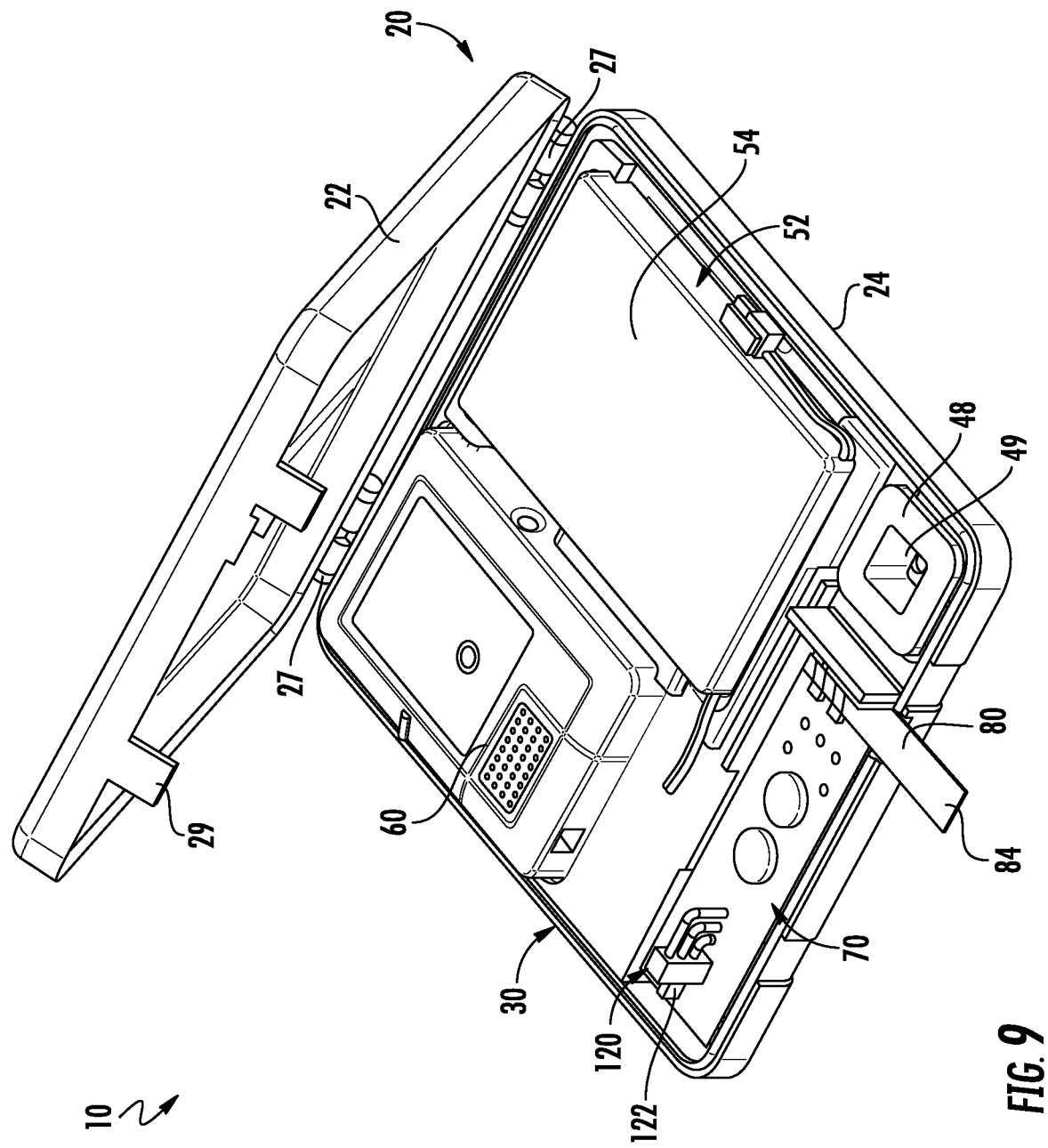
FIG. 9 is an perspective view of an open tracking device according to another embodiment of the invention.

The tray 30 also includes a contoured first area 44 and an adjacent second area 46 configured to receive a power unit 52 and a tracking unit 60, respectively. As illustrated in FIGS. 4 and 9, the power unit 52 generally includes at least a power supply 54, such as a battery for example, configured to supply power to the tracking unit 60 and any device electrically connected thereto, such as via a first set of leads 56 for example. The at least one power supply 54 may be any size and/or configuration. In one embodiment, the at least one power supply 54 within the power unit 52 is rechargeable. In such embodiments, an external charging device (not shown) may be configured to connect directly to the power supply 54. Alternatively, at least one rechargeable power supply 54 may be recharged when the tracking device 10 is connected to an external power supply, such as an AC or DC voltage source for example.

The tracking unit 60 operably coupled to the power unit 52 is configured to generate location coordinates and/or relative location data indicative of a position of the tracking device 10, such as with a GPS receiver for example. In one embodiment, the tracking unit 60 determines the position of the tracking device 10 using global position data and/or through triangulation of data provided from network services, such as a cellular network for example. The tracking unit 60 additionally includes a processor and radio (not shown) configured to wirelessly transmit the collected location data, such as via the cellular network for example. The processor and radio may be separate components within the tracking unit 60 or may be integrally formed with another component of the tracking unit 60.

In addition, the tracking unit 60 may also include one or more digital or analog sensors 68 configured to monitor characteristics of the tracking device 10 or its surrounding environment. The processor of the tracking unit 60 may be configured to monitor the data measured by the sensor(s) and transmit that data along with the location data. In one embodiment, the tracking unit 60 includes an accelerometer configured to function as a shock sensor 68 by monitoring the motion of the tracking device 10. In the non-limiting embodiment illustrated in FIG. 1, the tracking unit 60 includes a temperature sensor 68 configured to measure the ambient temperature surrounding the tracking device 10. One or more sensors of the tracking unit 60 may be arranged within the central opening 49 of the pair of stacked seals 48 of the first or second cavity 40, 42 of the tray 30 or the enclosure halves 22 and 24, or alternatively, may be arranged outside of the housing 20 of the tracking device 10. A first hole or group of holes 92 may be formed in the top portion 22 of the housing 20, directly adjacent the first or second cavity 40, 42, such that ambient air surrounding the tracking device 10 flows through the first hole 92 to a sensor 68 arranged therein. The pair of stacked seals 48 extending between the tray 30 and the top portion 22 of the housing 20 surrounds the sensor 68. The seals 48 are configured not only to isolate the sensor 68 from the heat generated by the electronic components within the tracking device 10, but also to trap any moisture that enters into the housing 20, such as through the first hole 92 for example, within the first or second cavity 40, 42 of the tray 30.

Figure 5:
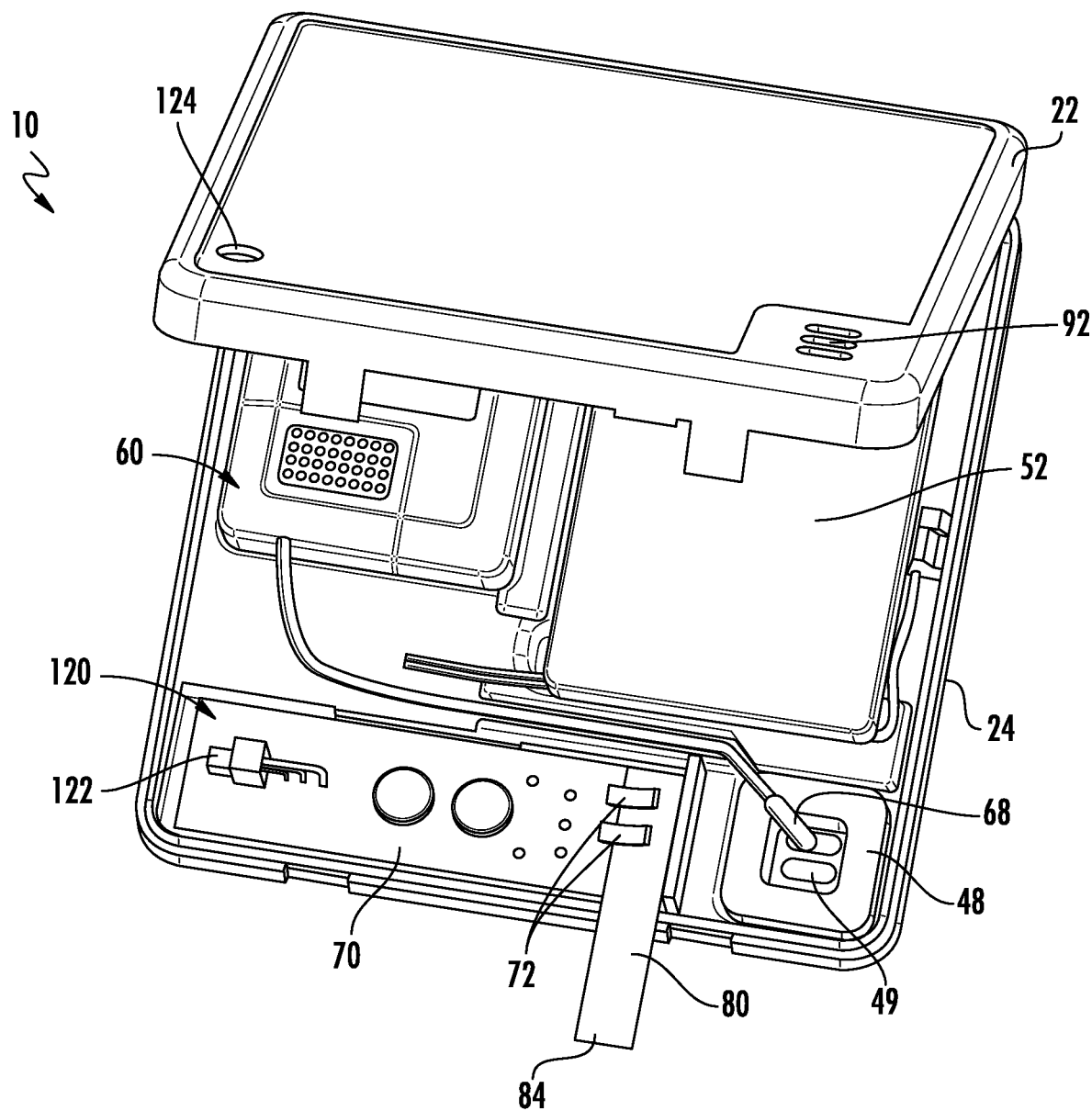
FIG. 5 is a perspective view of a tracking unit and sensor within the tracking device according to an embodiment of the invention.

Referring now to FIG. 5, a circuit board 70 configured to couple the power unit 52 and the tracking unit 60 includes at least one tab 72 formed from a conductive material such as metal for example. In one embodiment, the tab 72 is arranged generally adjacent the second cavity 42 of the tray 30 (FIG. 4) or bottom portion 24 of the housing 20 (FIG. 5). A portion of the tab 72 is generally biased into contact with an adjacent conductive interface 74 formed in the surface of the circuit board 70, such as a ground or contact for example. When the tab 72 contacts the conductive interface 74, the circuit coupling the power unit 52 and the tracking unit 60 is completed such that the device is active.

To retain the tracking device 10 in an inactive state, a first end 82 of a thin, flexible, non-conductive pull tab 80 is generally positioned between the conductive interface 74 and the portion of the tab 72 configured to engage the conductive interface 74. In the embodiment illustrated in FIGS. 1-4, the pull tab 80 is arranged generally parallel to the circuit board 70 and extends in the direction of the adjacent second cavity 42. In such embodiments, a second hole 94 may be formed in the top portion 22 of the housing 20, directly adjacent the second cavity 42, such that the second end 84 of the non-conductive pull tab 80 is configured to extend through the second hole 94 and outside of the housing 20 (FIG. 2). The second end 84 of the non-conductive pull tab 80 may be configured to extend through the central opening 49 of the pair of stacked seals 48 positioned within the second cavity 42 such that any moisture that enters the housing 20 through the second hole 94 is trapped by the seals 48 within the second cavity 42. In another embodiment, illustrated in FIGS. 5 and 7-10, the pull tab 80 is oriented generally perpendicular to the circuit board 70. As a result, the second end 84 of the pull tab 80 extends through an adjacent opening 96 formed in the bottom portion 24 of the housing 20.

When a pull tab 80 is installed between the tab 72 and the conducting interface 74, the tracking device 10 is generally in an inactive state. The tracking device 10 may remain in this inactive state for an extended period of time, such as for a few months for example. To activate the tracking device 10, an operator removes the pull tab 80. The pull tab 80 is configured to slide from the housing 20, such as through the pair of seals 48 and the second hole 94 or through opening 96 for example, when a force is applied to the second end 84 thereof. The biasing force of the tab 72 biases a portion of the tab 72 into contact with the adjacent conductive interface 74, thereby completing the circuit configured to provide power from the power unit 52 to the tracking unit 60.

Upon activation of the tracking device 10, the processor may perform one or more system checks to determine that the tracking device 10 is fully functional. For example, the processor may verify that tracking unit 60 is working, and if so, determine a current location of the tracking device 10. The processor may similarly initiate collection of data by the one or more sensors 68. In addition, the processor may be configured to check the wireless connectivity of the tracking device 10. If a wireless connection is available, the location and/or sensor information collected by the processor may be transmitted wirelessly to a receiver. Upon determination that the tracking device 10 is functioning properly, at least one audible or visual indicator, apparent to the operator holding the tracking device 10, is energized. In one embodiment, a colored LED, such as configured to emit a green light for example, flashes slowly to indicate that the device 10 is ready for deployment. Similarly, another audible or visual indicator may be energized if a user attempts to activate an expired tracking device 10.

The tracking device 10 may also be configured to transform to a semi-active state once transport of the shipment being tracked with the tracking device 10 is complete. The tracking unit 60 may determine that the shipment has reached a desired destination based on monitored conditions including location, movement patterns, elapsed time, adjacent temperature, or adjacent light for example. If one of the sensed conditions matches or exceeds a predetermined threshold, the tracking unit 60 will transform the tracking device 10 to a semi-active state. In one embodiment, an audible or visual indicator indicates to a user that the tracking device 10 has transformed to a semi-active state from the fully active state upon detection that the shipment has reached a final destination. Once the tracking device 10 enters a semi-active state, the tracking device 10 is configured to remain in a semi-active state until the power supply is depleted or the device 10 is reconditioned.

In the semi-active state, the monitoring performed by the tracking unit 60 of the tracking device 10 is reduced, resulting in extended battery life. The limited transmissions that occur when the tracking device 10 is in a semi-active state may be used to locate a "missing" device. In addition, because the transmissions over the network service are less frequent and possibly include less data, the charges associated with the use of the network service may also be reduced. In one embodiment, the tracking device 10 includes a label (not shown) indicating an "expiration date" and also an "active life" of the tracking device. The active life of the tracking device 10 will be pre-configured and will be included in the logic for transforming a device 10 from fully active to a semi-active state. The expiration date and active life of the tracking device 10 may be customized based on the distance and expected time to transport a shipment. If a user tries to activate an expired tracking device, an audible or visual indicator will indicate to the user that the device 10 has expired.

Figure 10:
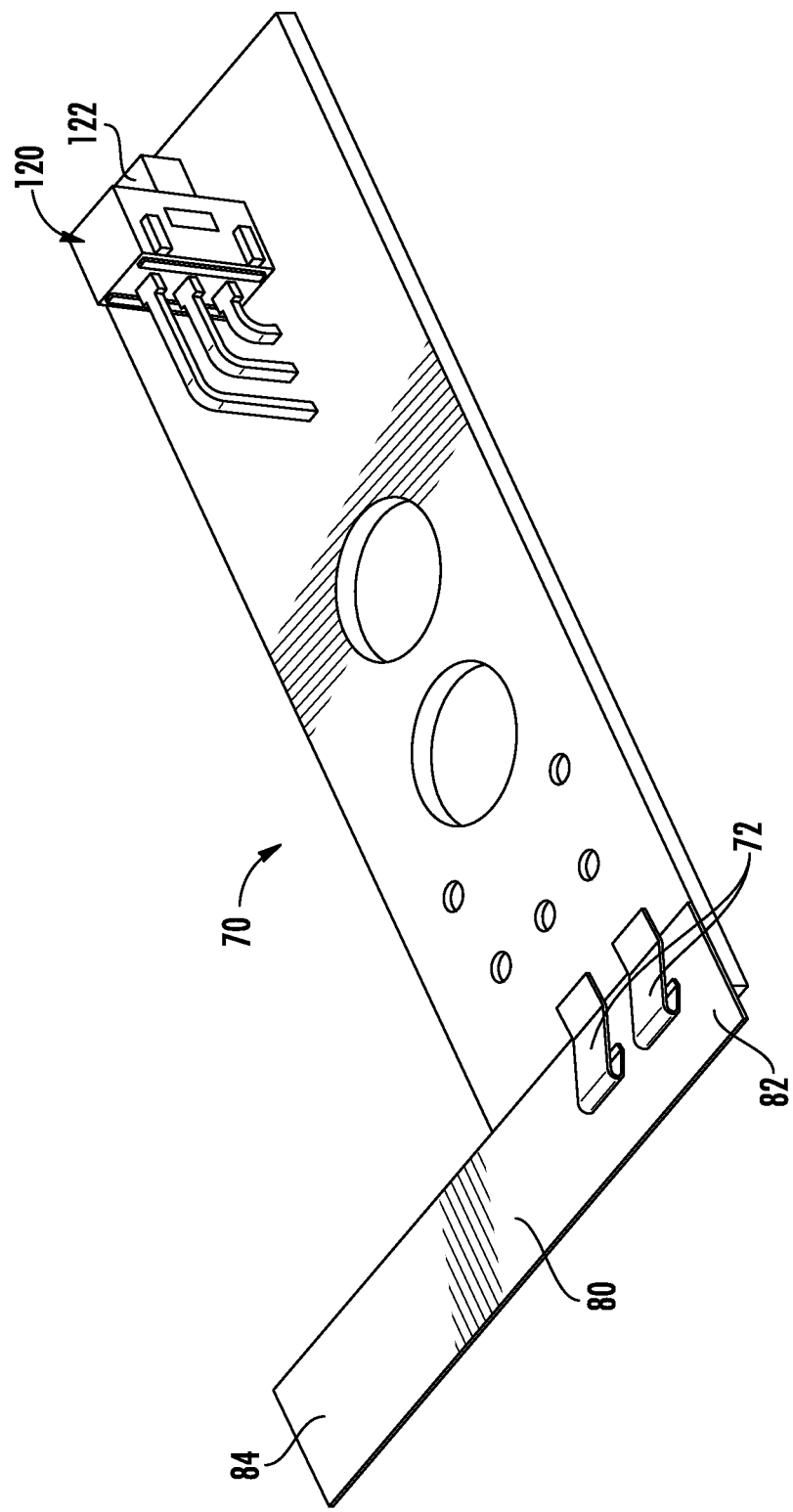
FIG. 10 is a perspective view of the circuit board including the activation and shut off mechanism according to an embodiment of the invention.

In one embodiment, illustrated in FIGS. 9 and 10, the tracking device 10 additionally includes a shut-off mechanism 120, such as mounted to the circuit board 70 at an end 76 opposite the tab 72 for example. In one embodiment, the shut-off mechanism 120, operably coupled the power unit 52, is configured to transform the tracking device 10 to an inactive state by interrupting the power provided by the power unit 52 to the tracking unit 60, for example when the tracking device 10 reaches an intended shipment destination. In another embodiment, the shut off mechanism 120 is configured to transform the tracking device 10 to either a semi-active or a sleep state by altering the logic control of the tracking unit 60.

The shut-off mechanism 120 includes a switch 122 movable generally vertically along an axis between a first position (FIG. 10) and a second position (not shown). When the switch 122 is in the first position, such as when the tracking device 10 is in an active state, the power unit 52 supplies power to the tracking unit 60. In one embodiment, when the switch 122 is in the second position, a break in the circuit is created, thereby stopping the supply of power to the tracking unit 60. Alternatively, movement of the switch 122 to the second position may alter the logic control of the tracking unit 60, causing the tracking device 10 to transform to a semi-active or a powered sleep state. In the sleep state, power is still provided from the power unit 52 to the tracking unit 60, but only minimal operation of the processor occurs. For example, the tracking unit 60 does not measure or record position or sensor data when in the sleep state.

An opening 124 is formed in the top portion 22 of the housing 20 adjacent the shut off mechanism 120. The opening 124 is sized to provide an operator with limited access to the switch 122. The opening 124 is configured to allow an operator to move the switch 122 from the first position to the second position, but prevents the operator from returning the switch 122 to the first position once in the second position. The switch 122 is generally returned to the first position during reconditioning of the tracking device 10, such as by opening the housing 20 for example.

Figure 6:
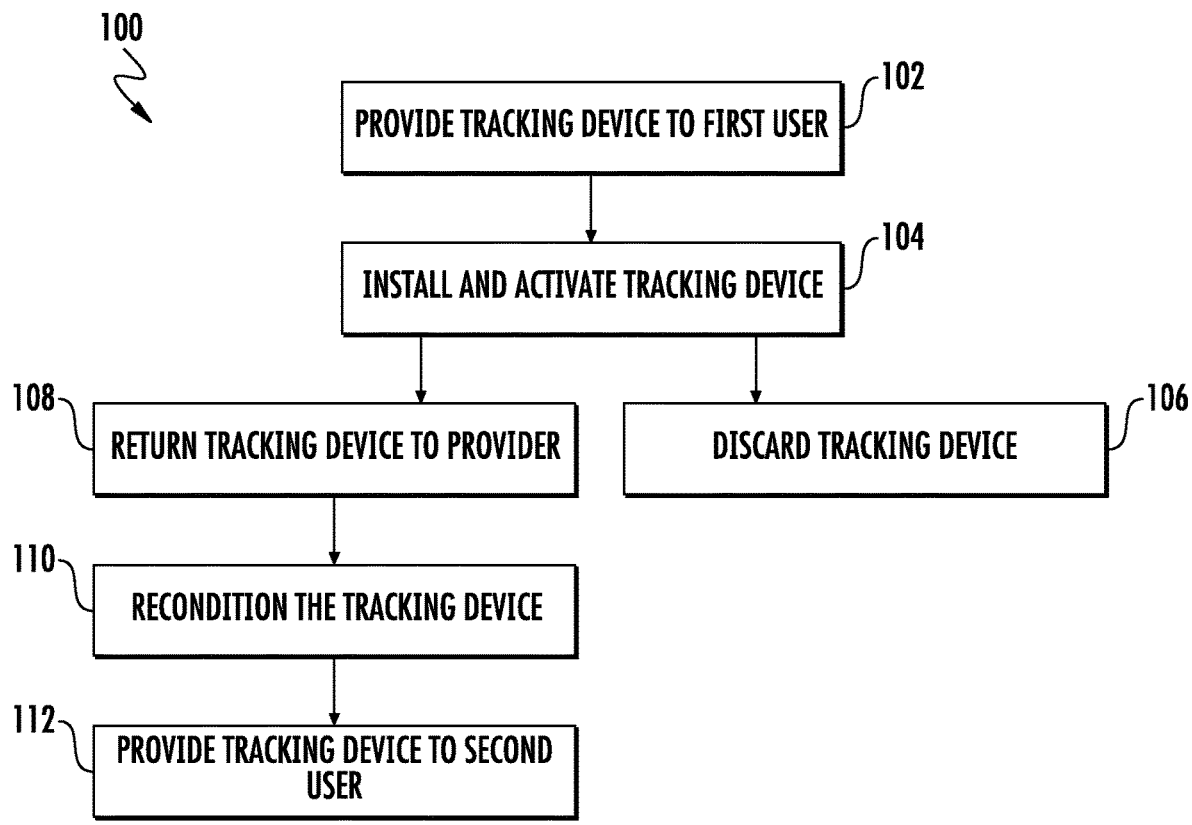
FIG. 6 is a flow diagram of a method for using a tracking device according to an embodiment of the invention.

Referring now to FIG. 6, a method 100 for using a tracking device 10 is illustrated. The tracking device 10 is intended to allow a user to remotely monitor the position and environmental conditions of at least one item of cargo during a single shipment in real time. In block 102, the tracking device 10 is supplied from a provider to a first user. In one embodiment, a pre-addressed return envelope or package for returning the tracking device 10 to the provider may be included with the tracking device 10. After associating the tracking device 10 with the desired cargo, the first user installs and activates the tracking device 10 by removing the pull tab 80 such that the tracking device 10 is transformed from an inactive state to a fully active state, as shown in block 104. When the tracking device 10 is in an active state, the GPS and sensor information (i.e. temperature, humidity, speed) collected by the processor of the tracking unit 60 is generally transmitted in real-time, such as via a cellular network for example, to a data host company for storage.

Using a unique identifier associated with the tracking device 10 monitoring the user's specific shipment of cargo, the user may access the data stored by the data host company, for example through a secure website and/or software. The website and/or software includes at least one algorithm configured to process the data collected by the tracking unit 60 and generate actionable reports. Exemplary actionable reports include, but are not limited to viewable screens, maps tracking the movement of the shipment over time, and graphs tracking the environment conditions of the cargo over time for example.

In one embodiment, shown in block 106, the first user discards the tracking device 10 once the cargo has arrived at a desired destination. In another embodiment, shown in block 108, after the cargo arrives at a final destination, the first user returns the tracking device 10 to the provider, such as with the pre-addressed envelope for example. The first user may be motivated to return the tracking device, such as with a recycling credit offered by the provider for example. When the tracking device 10 is either discarded or returned to the provider, the tracking device 10 is generally in a semi-active state unless the at least one power supply 54 has been depleted.

As shown in block 110, in embodiments where the tracking device 10 is returned to the provider, the tracking device 10 is then reconditioned. The top and bottom portions 22, 24 of the housing 20 are separated to access the circuit board 70 coupling the power unit 52 and the tracking unit 60. A pull tab 80 is reinserted between the metal tab 72 and the conductive interface 74 to break the supply of power to the tracking unit 60 and return the tracking device 10 to an inactive state. In addition, the provider may charge and/or replace the at least one power supply 54 of the power unit 52. A new housing 20 is installed and sealed so that the tracking device 10 is configured for use during another single shipment. As illustrated in block 112, the provider supplies the same tracking device 10 to a second user. The second user may, but need not be, different from the first user.

The tracking device 10 described herein includes a plastic clamshell housing 20 and donut seals 48 that together form a low cost, waterproof packaging having a pull-tab activation device 80 and external sensors 68. The tracking device 10 provides more efficient and cost effective monitoring than conventional tracking devices. Inclusion of a temperature sensor exposed to the ambient air will provide more accurate readings will be less prone to damage. Also, the molded plastic clamshell housing is lighter and more durable. In addition, the activation and verification initiated by removing the pull tab simplifies the work required by an operator to ensure that the tracking device 10 is fully functional.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tracking device configured to track a shipment of cargo, comprising:
    a housing having a complementary first portion and second portion, the first portion and the second portion being pivotally coupled, a hole being formed in the first portion of the housing;
    a seal having a central opening positioned within the housing, the seal being positioned adjacent the hole, the seal surrounding the hole with the central opening aligned with the hole;
    a tracking unit arranged within the housing and configured to collect and transmit data;
    a power unit having at least one power source arranged within the housing, the power unit being configured to supply power to the tracking unit;
    a circuit board connecting the power unit and the tracking unit, the circuit board includes a metal tab arranged adjacent a conductive interface; and
    a portion of a pull tab formed from a thin, non-conductive material arranged between the metal tab and the conductive interface, a distal end of the pull tab extending through the central opening of the seal and the hole formed in the first portion of the housing, wherein the tracking device is configured to transition from an inactive state to a fully active state upon removal of the pull tab;
    wherein the tracking device includes a sensor coupled to the tracking unit;
    wherein the sensor is positioned within a central opening of a second seal arranged within the housing adjacent another hole formed in the housing, the second seal being configured to isolate the sensor from heat generated within the tracking device and to trap moisture within the central opening thereof.

2. The tracking device according to claim 1, wherein the metal tab is biased into contact with the conductive interface.

3. The tracking device according to claim 1, wherein the at least one power source includes at least one battery.

4. The tracking device according to claim 3, wherein the at least one battery is rechargeable.

5. The tracking device according to claim 1, wherein the tracking device is configured to transition from the fully active state to a semi-active state when a condition being monitored by the tracking unit reaches a predetermined value.

6. The tracking device according to claim 1, wherein the circuit board further includes a shut off mechanism positioned adjacent a first hole in the housing, the shut off mechanism includes a switch movable between a first position and a second position.

7. The tracking device according to claim 6, wherein movement of the switch to the second position interrupts the supply of power from the power unit to the tracking unit.

8. The tracking device according to claim 6, wherein movement of the switch to the second position alters the logic control of the tracking unit.

9. The tracking device according to claim 8, wherein movement of the switch to the second position transitions the tracking device to a semi-active state.

10. The tracking device according to claim 8, wherein movement of the switch to the second position transitions the tracking device to a sleep state.

* * * * *